No. 890,901. PATENTED JUNE 16, 1908.
C. W. GRAHAM.
MACHINE FOR MAKING CANS.
APPLICATION FILED JUNE 11, 1903.
6 SHEETS—SHEET 1.
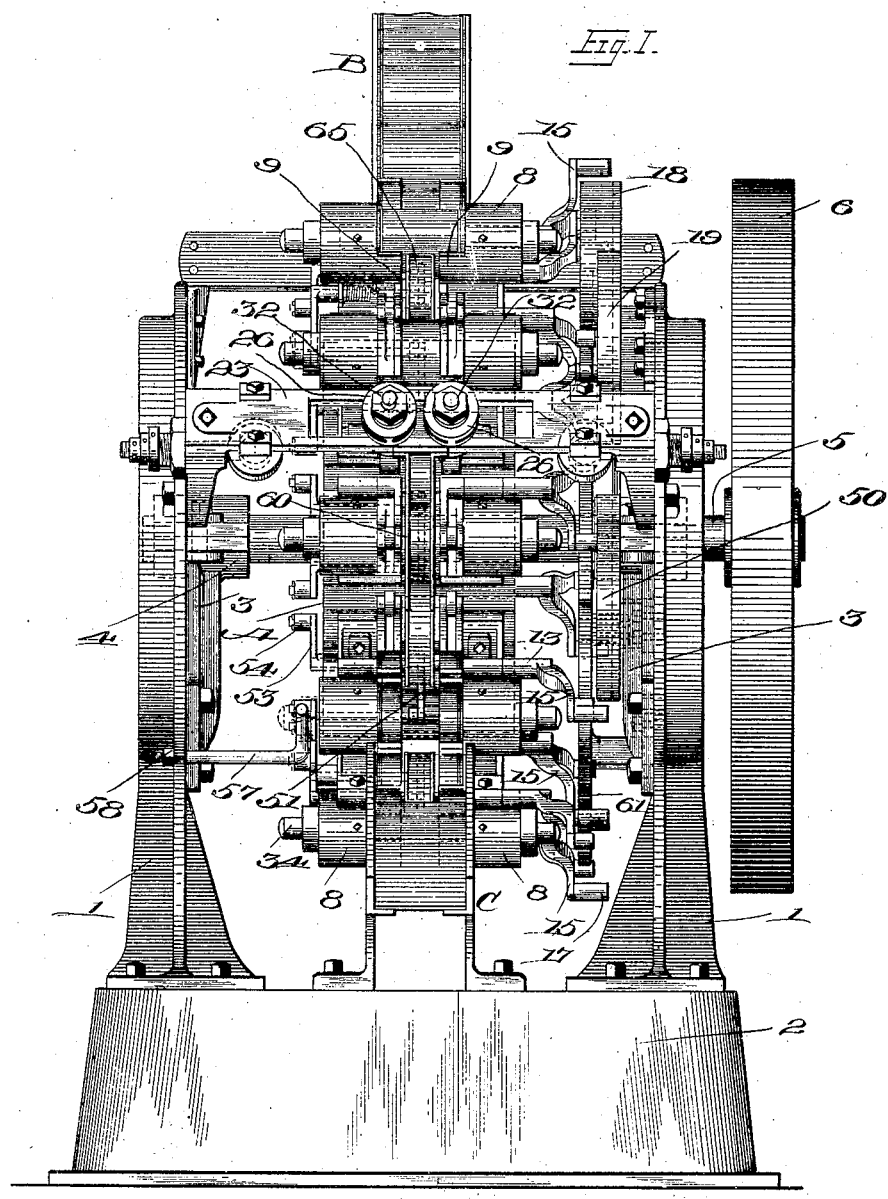

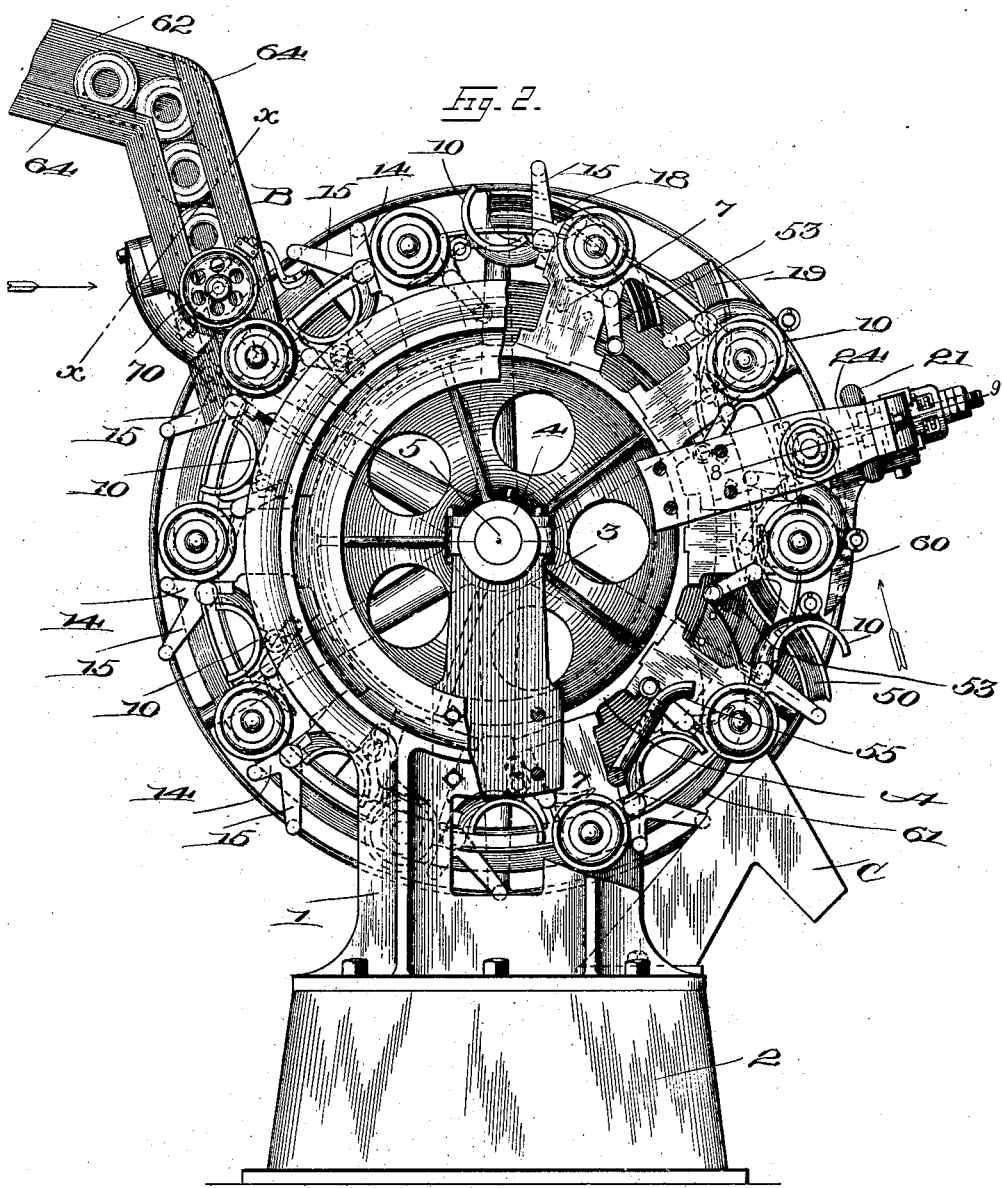

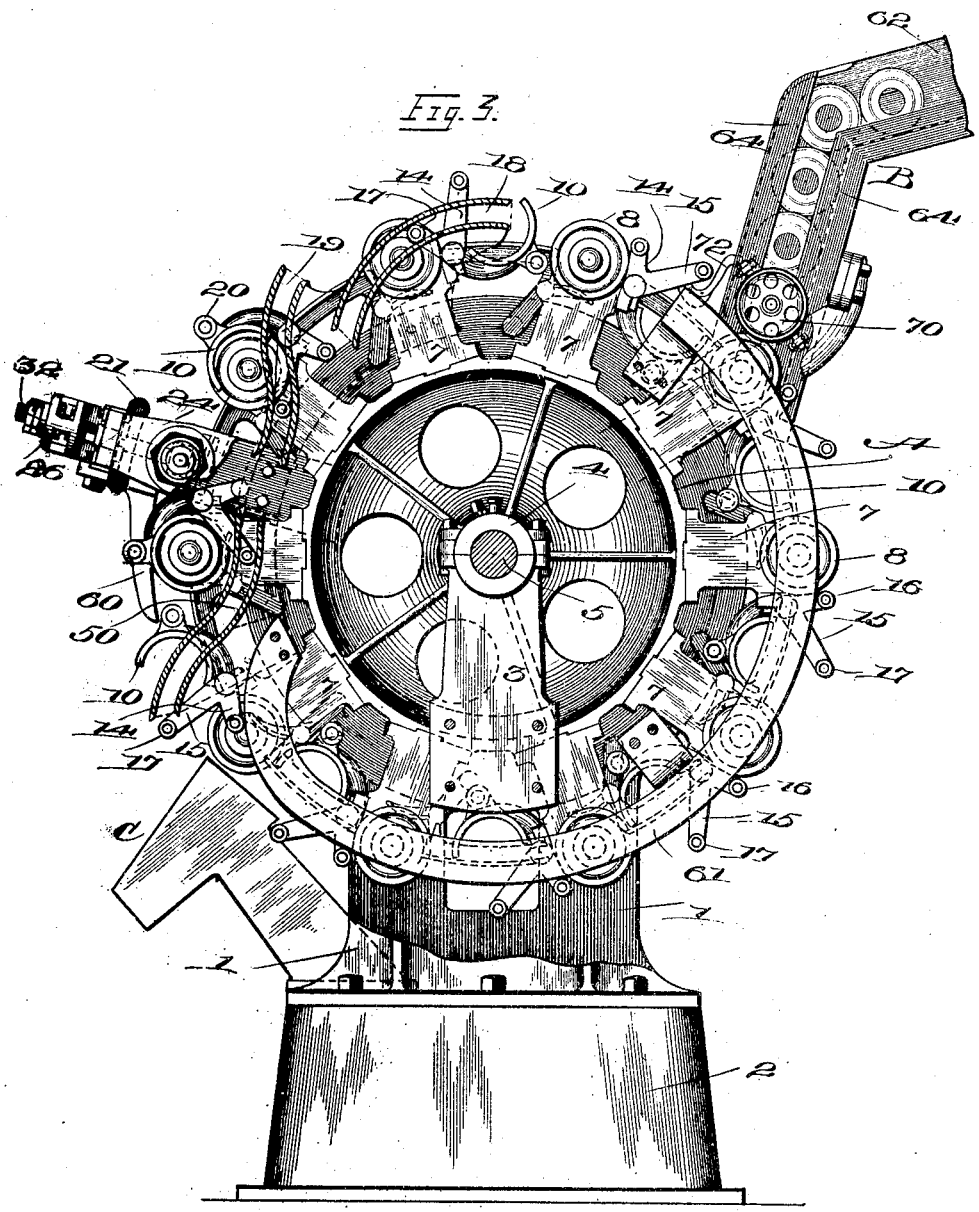

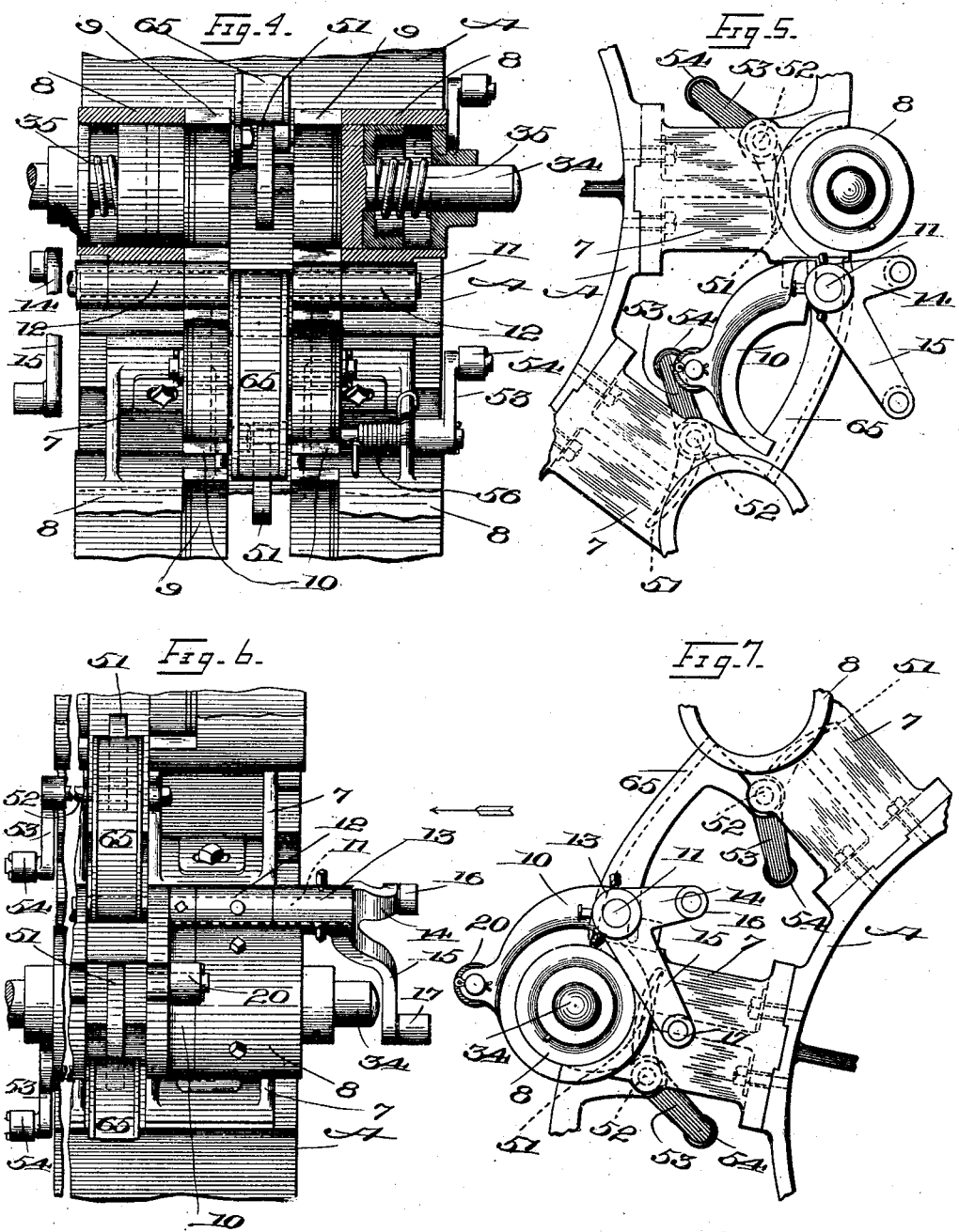

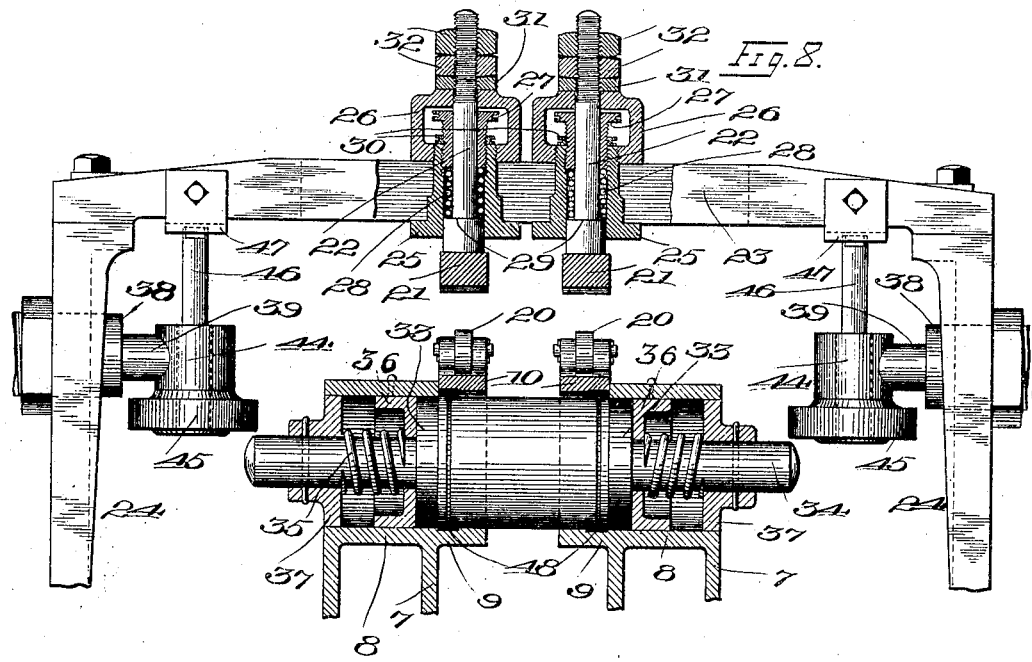
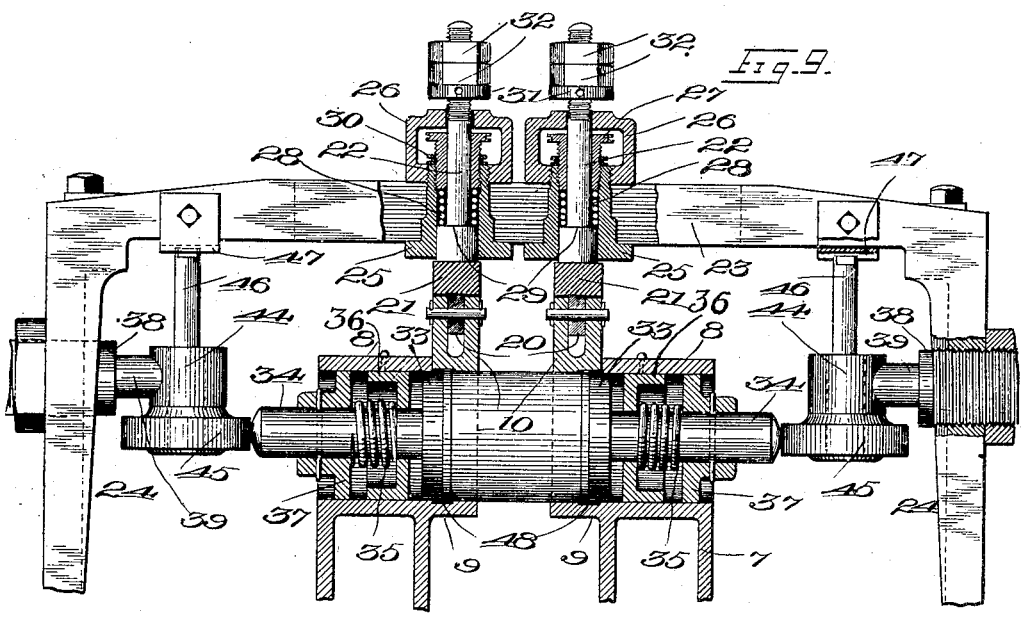

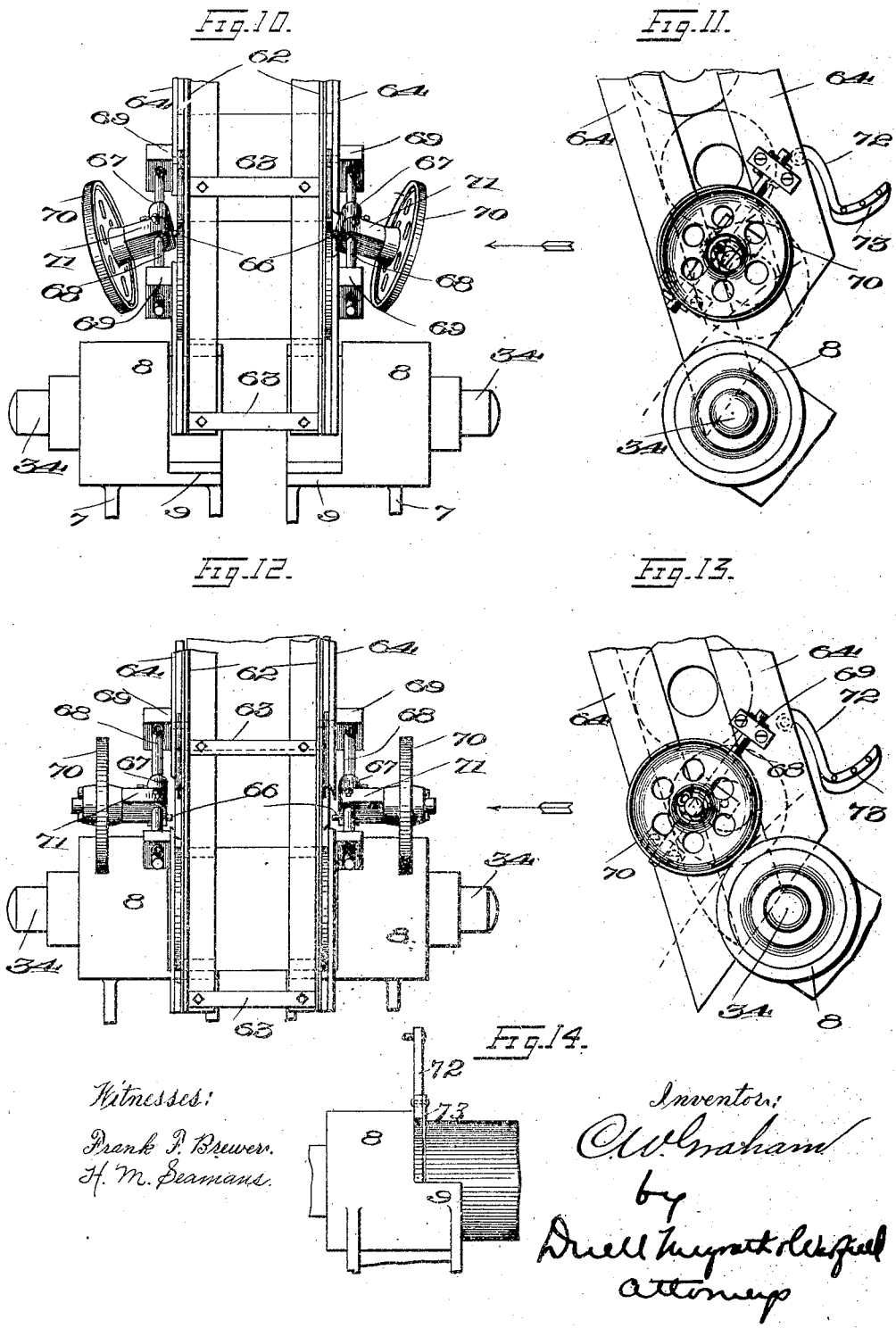

UNITED STATES PATENT OFFICE.

CHARLES W. GRAHAM, OF ROME, NEW YORK, ASSIGNOR TO UTICA INDUSTRIAL COMPANY OF ROME, NEW YORK, A CORPORATION OF NEW YORK.

MACHINE FOR MAKING CANS.

No. 890,901.      Specification of Letters Patent.      Patented June 16, 1908.

Application filed June 11, 1903. Serial No. 160,974.

*To all whom it may concern:*

Be it known that I, CHARLES W. GRAHAM, residing at Rome, in the county of Oneida and State of New York, have invented certain new and useful Improvements in Machines for Making Cans, of which the following is a full, clear, and exact description, such as will enable others skilled in the art to which it appertains to make and use the same.

The invention relates to a machine for applying heads or ends to can bodies and similar articles. Its object is to provide a new and improved machine for this purpose which shall be comparatively simple in construction and very efficient in operation.

Further objects and advantages will be, in part obvious from the following description and in part pointed out.

The invention consists in the features of construction, combinations of elements and arrangement of parts which will be hereinafter fully described and the novel features thereof pointed out in the claims.

In the accompanying drawings which illustrate an embodiment of the invention, Figure 1 is an end elevation of the assembled machine. Fig. 2 is a side elevation with parts broken away. Fig. 3 is a side elevation looking from the opposite side with the framework broken away and certain parts in section. Figs. 4 and 5 are details in plan and side elevation respectively, showing the mounting of the heading jaws and certain parts connected therewith. Figs. 6 and 7 are similar views showing the parts in a different position. Fig. 8 is a detail showing a bridge which carries the clamping pressure shoes, and also showing a pair of heading jaws in a position which they would assume when being carried up into position to be engaged by said pressure shoes. Fig. 9 shows the same parts in a position which they assume when a pair of heading jaws has been brought to a position beneath the pressure shoes on the bridge. Fig. 9ª is a detail showing the flexible mounting of the plunger-actuating rollers of Figs. 8 and 9. Figs. 10 and 11 are details in plan and side elevation on line *x—x* Fig. 2, respectively showing the end of the feeding-in chute and the detents for controlling the movement of the can heads or ends. Figs. 12 and 13 are similar views showing the parts in different positions. Fig. 14 is a detail illustrating the operation of a presser finger and separator which acts upon the ends and between the ends and bodies.

Similar reference characters refer to similar parts throughout the several views.

The machine as illustrated comprises in general a rotating spider or drum, which carries a series of holding jaws to which the can bodies and ends or heads are delivered from a feeding-in chute, a pivoted or swinging jaw or mold being provided in connection with each holding jaw, which swinging jaws during the rotation of the machine are swung down upon the tops of the blanks held in the main jaws by the action of cams fixed to the frame. The blanks being thus held are carried to a pressure device by the action of which the heads are forced onto the bodies, the swinging jaws being thereafter released and thrown back, the can ejected and the jaws carried around beneath the chute where they receive another set of blanks.

The frame of the machine comprises two webbed side standards 1, 1 which may, if desired, be supported upon a suitable base 2 and which carry, preferably removably connected thereto, castings or members 3 which provide bearings as at 4, 4 for the driving shaft 5 of the machine which may be driven by any suitable source of power as the pulley 6.

Carried by the driving spindle is the spider or drum A around the periphery of which are secured, preferably by means of an adjustable longitudinal slot and clamping bolt connection, as best shown in Figs. 5 and 6, chairs 7 which carry at their upper ends, preferably integral therewith, as shown in Figs. 8 and 9, the holding or receiving jaws which are in the form of opposing open tubes or cylinders 8, 8, each carried by a chair, and each tube having extended from the lower side thereof a substantially semi-circular flange 9, the distance between the two opposing tubes being sufficient to permit the depositing of a can body with the heads one for each end thereof within the jaws so that they will rest upon the extended flanges 9. In connection with each pair of fixed jaws is a pair of swinging half molds or jaws 10, 10, which are pivoted upon the rock shafts or spindles 11 mounted in bearings 12 adjacent the sides of the fixed jaws so that when the shaft 11 is rocked the swinging half molds or jaws may close down over the ends of the can bodies held by the fixed jaws; thus tending to hold the bodies and ends together.

A feeding-in chute B delivers the can bodies and ends to the fixed jaws, the swinging half molds 10 being then thrown back to the rear of the fixed jaws as best shown in Figs. 2 and 3. Upon the end of the rock shaft 11 which actuates the swinging half molds is fastened a bell crank or more accurately double armed lever 13 having a short arm 14 and a long arm 15 equipped with anti-friction rollers 16, 17, which are adapted to enter cam slots or grooves formed by plates connected to the framework on one side of the machine and projecting inwardly therefrom. An advantage in the machine to be noted in this regard is that the two swinging half molds, one for each end of the can, are both adapted to be operated from one side of the machine by a single set of cam ways. There is here a gain in compactness and in certainty of operation.

It will be sufficient for the purposes of this description to follow the action of a single set of jaws in their passage around the machine, and, for this purpose, the views in Figs. 2 and 3 may be taken as successive views of the same set of jaws at different stages of the operation.

Referring more particularly to Fig. 3, the jaws or molds are carried beneath the chute and the swinging half molds remain in their normal position in the rear of the fixed jaws, until the roller 16 on the end of the short arm of the double-armed lever enters a first cam-way 18. As the rotation continues, the swinging half molds are gradually thrown up about their pivots and closed down upon the blanks, coming into the position shown in Fig. 8. Before the short arm of the double-armed lever passes out of the cam-way 18 the roller of the long arm passes into a second cam-way 19 so shaped as to swing the half molds still closer about the can blanks.

There is a particular advantage in the construction illustrated wherein the swinging jaws are operated alternately by different arms of a double-armed lever attached to their spindle, in that if a lever were used having only a single arm there would be a point in the travel of the carrier where the jaws would come upon a dead center and would not be under the control of the cam way. Such construction might not be entirely impracticable but would not give the steady, evenly timed motion which is given by the present construction and it will be obvious that in machines of this character it is necessary that the various operations should be regular in their character and should be very accurately timed. Hence the advantage of a construction wherein, as one arm of the double-armed lever leaves its cam way, or in the construction illustrated before it leaves its cam way but at the point where the parts would reach a dead center, the other arm of the double-armed lever is picked up by a cam way and the swinging of the jaw is then controlled by the second cam way. It will also be seen that the short arm of the double-armed lever will first give the jaw a quick closing movement and then the longer arm will complete the closing movement with less speed and more force. The long arm of the double-armed lever passes out of engagement with cam-way 19 just as the anti-friction rollers 20 on the tops of the swinging half molds are brought into rubbing engagement with the flexibly mounted pressure shoes 21 carried at the ends of studs 22 mounted in a bridge 23, the side members of which 24, 24 are connected to the standards 1, 1 at opposite sides of the machine.

As shown in Figs. 8 and 9 the bushings 25 through which these studs pass are adjustable in a longitudinal slot along the bridge and may be locked by means of a hollow nut 26 having open or webbed sides. The upper end of the bushing 25 is also internally threaded for the reception of an abutment member 27 which provides an abutment for one end of the spiral spring 28 encircling the stud, the other end of the spring being seated against an annular shoulder on the stud as at 29. A lock nut 30 may be provided in connection with this adjustable abutment if desired. The upper end of the stud 22 is threaded and carries a yielding washer 31 and adjusting and locking nuts 32 by setting which the downward motion of the stud under the influence of the spring 28 may be adjusted. Thus it will be seen that there is provided an adjustable and spring-controlled pressure shoe, the lower face of which is of cam shape, as shown in Fig. 3, such that the anti-friction rollers on the swinging half molds will strike the curved front edge of the shoes slightly above the lowest plane thereof, thereby, as the rotation continues, forcing the half molds down tightly upon the can blanks and holding them there while the friction rollers follow the curve of the pressure shoes. This mode of operation will be clear from an inspection of Fig. 9, as will be also the operation of the heading plungers. These plungers are in the shape of pistons 33 of diameter approximating the diameter of the can head and such as to work easily within the tubes or cylinders 8 which form the closed parts of the fixed jaws. Each plunger is guided by a stud 34 around which is coiled a spiral spring 35, one end of which bears against an abutment 36 fixed within the cylinder 8 and the other end of which bears against a collar 37 fixed to the stud, the tendency of the spring being thus normally to carry the plunger rearwardly to the position shown in Fig. 8. Carried by the side members 24 of the bridge are bushings 38 which carry short studs 39 spring-controlled and adjustable by means of springs 40, abutment 41 and nuts 42, 43 in the same manner as the adjustment of the pressure shoe studs 22 already described. The inner ends of these studs carry sleeves 44 in connection with which are mounted so as to be readily rotated with reference thereto anti-friction rollers or wheels which, for the present purposes, may be termed cam wheels or surfaces 45. Thus the anti-friction rollers and the sleeves are normally held by the influence of the springs 40 pressed towards the center of the bridge in the position shown in Fig. 8, but they are capable of reciprocating motion, which reciprocating motion is guided by a pin 46 which is connected to the sleeve 44 and the upper end of which is guided in a groove extending longitudinally of the bridge as at 47. The anti-friction rollers or cams 45 are positioned to engage the ends of the plunger studs 34 as the jaws are brought beneath the bridge in the operation of the machine and they are so positioned and the spring pressure by which they are controlled is so adjusted that while the swinging half molds are held clamped tightly to the can blanks the plungers will be forced forward, as they follow the curve of the periphery of the anti-friction rollers 45, and will force the heads upon the can bodies as shown in Fig. 9. In order to allow the encircling of the can body by the head and yet to provide jaws which may hold the can body closely, it is preferable that there should be provided grooves in the fixed jaws and in the swinging half molds as at 48, 48 which will allow for the slightly differing diameters of the heads and body.

An advantage of the machine to be noted at this point is in the fact that the heading plungers, as the machine is rotated, are forced into action with a gradual easy movement inasmuch as this movement is caused by the contact between the rounded outer ends of the studs 34 and the rounded periphery of the surface of the anti-friction rollers or wheels 45 which at the same time is free to move both away from the end of the stud under spring pressure and free to revolve on a vertical axis, so that any inequalities may be compensated for and the motion of the plungers while it is smooth and easy be such as to take up any decrease, or to compensate for any increase in the size of the can bodies, heads, &c. Following further the rotation of the machine, and referring more particularly to Fig. 3, as the jaws leave the bridge the roller on the end of the long arm of the double-armed lever is again picked up by a cam way 50 which is in substance a continuation of the cam-way 19, there being a break between the ends of the two in order that the swinging half molds may be entirely under the control of the pressure shoes while the plungers are operating. The pitch of this cam-way 50 is such that the end of the double-armed lever is now carried rapidly outward and the swinging half molds thrown back leaving the cans which have the heads now securely fastened thereon in position to be ejected into a receiving chute C by the action of an ejector or kicker which is provided in connection with each set of fixed jaws and the ejecting arm 51 of which passes between the two jaws of each pair. This ejecting arm, most clearly shown in dotted lines in Figs. 2, 5 and 7, is pivoted upon a rock shaft 52, an arm 53 projecting inwardly from which carries an anti-friction roller 54 which, as best shown in Fig. 2, is positioned, at the moment when it is desired to eject the can, to be picked up by the cam surface of an arm 55, thereby rocking the shaft 52 and throwing forward the ejector arm which throws the can from the jaws into the receiving chute. A spring 56 shown in Fig. 4, acting upon the shaft 52 returns the ejector arm to normal position outside the plane of the holding jaws as the roller 54 leaves the cam arm 55. This cam arm 55, as shown in Fig. 1, is formed at the end of the rod 57 projecting inwardly from the frame and adjustable with reference thereto by means of a nut 58. I also preferably provide, corresponding to the point where the swinging half jaws begin to move away from the cam after leaving the bridge as the double-armed lever is picked up by the cam way, a stripper arm or bar preferably constructed of two spaced members 60, 60, connected to and projecting from the bridge. The lower edges of this stripper bar or bars are cut away or formed on a curve corresponding to the curve of the path of travel of the cans and they are so positioned that, as the swinging half molds are thrown back they pass one on each side of the stripper bars, which prevent the cans following the swinging molds, whether by the influence of the frictional contact of their surfaces or by suction therebetween. As the long arm of the double-armed lever leaves the cam-way 50 the short arm of the lever is picked up by a long cam bar 61 on which the roll on said short arm travels, thereby holding the swinging half molds open until the jaws have again been brought underneath and beyond the chute and the can blanks have been deposited therein. For this purpose, as shown in Fig. 3, the cam bar 61, the greater portion of which is conveniently of semi-circular form and is supported from any suitable point of the framework, extends to a point just beyond the chute B. As the short arm of the double-armed lever leaves the end of this cam, it is then free and its roll is in position to be picked up by the first cam-way 18 during a repetition of the cycle of operations.

The details of the chute construction and of the detents for controlling the feeding of the blanks are shown in Figs. 10 to 14 inclusive. As there shown, the chute is made up of long angle plates 62 preferably of sheet metal or other like material, spaced apart to provide ways for the cam bodies and secured together by cross straps 63. On the sides of the ways for the bodies are provided narrow chutes formed by the plates 64, spaced from the plates 62 of the main chute, down which the can ends or heads roll. The mouth of this chute is in a position to feed the bodies and ends into the holding jaws as these jaws are successively brought beneath it. In order that the blanks may not be fed between the jaws or between the chairs 7 instead of into their proper position in the jaws, I provide, primarily spanners or filling blocks 65, best shown in Figs. 5 and 7, which extend between successive chairs and prevent the dropping of the blanks therebetween. The feeding of the can heads is further regulated by means of pins 66, adapted to engage the blanks in each side chute and normally held in contact with the lowest one of each line to prevent movement thereof. These pins are carried on arms 67, rocking with short shafts 68 having bearings in lugs 69 projecting from the sides of the chute. The shafts are rocked at intervals to free the pins from the lowermost blanks by means of anti-friction rollers or wheels 70 carried by arms 71 projecting from and secured to the rock shafts, which wheels are in such position that as the fixed jaws are, in the rotation of the machine, brought up toward the chute the curved upper peripheries of the cylinders 8 engage the wheels 70 and raise them as shown in Figs. 2, 12 and 13 thereby carrying the pins 66 down and releasing the lowermost blanks of the line. As soon as a set of jaws has passed the wheels 70 will again drop and the detent pins will then be again brought into position to hold the succeeding blanks. In order that the end blanks may be properly positioned both with reference to the holding jaws and with reference to the body blanks which are held therebetween, I provide presser fingers and separators 72 pivotally mounted one on each side of the chute and carrying thin depending plates 73 which are adapted to pass between the edge of the body blank and the flange of the end blank as the carrier is rotated beneath the chute while the lower surface of the detent or finger proper will rest upon the periphery of the end blank as shown in Fig. 14, and tend to force it down into position if it is not already in proper position. Thus these presser fingers act by gravity, as each set of jaws is brought beneath the ends of the chute and the blanks deposited therein, to position the blanks both with reference to each other and to the jaws, in order that, when clamped between the two sections of the jaws, they may be in proper position to be operated upon by the heading plungers.

It is believed that the features of construction, advantages and operation of this machine will now be apparent. It is to be understood that I do not consider myself limited to the details of construction or mode of operation herein set forth as various changes would be readily suggested which, while they might materially change the appearance of the machine, would not involve a departure from the scope of the invention herein set forth. Accordingly the mounting of various parts, the means by which various parts are made adjustable, the relative positions of various parts, and the timing of operations may be materially varied under this invention. It will also be understood that the terminology used, in the description, is descriptive and not limiting, being chosen merely as a convenient form of describing the things which constitute the invention here disclosed, the identity of which is apart from their definition in language or their working-out into concrete form by a skilled mechanic.

Having described my invention, what I claim as new and desire to secure by Letters Patent is,—

1. In a machine of the class described, in combination, a traveling carrier, means thereon for receiving and holding blanks to be operated upon, a pair of swinging jaws adapted to be clamped upon the ends of the blanks held by said first-mentioned means, and means for operating both of said jaws from one side of the path of travel of said carrier.

2. In a machine of the class described, in combination, a traveling carrier, means thereon for receiving and holding blanks to be operated upon, a pair of swinging jaws adapted to be clamped upon the ends of the blanks held by said first mentioned means, and means for operating both of said jaws from one side of the path of travel of said carrier at the same time.

3. In a machine of the class described, in combination, a traveling carrier, a series of fixed jaws thereon adapted to receive and hold blanks to be operated upon, a pair of swinging half jaws pivoted on a spindle adjacent each side of the fixed jaws, a lever at the end of said spindle and cam surfaces connected to the framework at one side of the machine adapted to control the movement of said swinging jaws.

4. In a machine of the class described, a traveling carrier, a fixed blank holding jaw supported thereon, a complementary swinging jaw pivoted adjacent thereto, arms connected to said swinging jaw, and adjustable cam surfaces arranged in the path of said arms whereby during the travel of the carrier the position of said swinging jaw with reference to said fixed jaw may be automatically regulated.

5. In a machine of the class described, in combination, a traveling carrier, a fixed blank holding jaw supported thereon a swinging jaw pivoted adjacent thereto, a double-armed lever mounted upon the pivot of said swinging jaw and cam surfaces in position to engage the arms of said double-armed lever for rocking the swinging jaw on its pivot during the travel of said carrier.

6. In a machine of the class described, in combination, a traveling carrier, a pair of jaws supported thereon adapted to receive the body and end blanks of a can or similar article, a pair of swinging jaws mounted adjacent said fixed jaws, lever arms connected to said swinging jaws and cam surfaces adapted to be engaged successively by said lever arms to move said swinging jaws with reference to said fixed jaws during the travel of the carrier.

7. In a machine of the class described, in combination, a traveling carrier, a pair of jaws supported thereon adapted to receive the body and end blanks of a can or similar article, a pair of complementary swinging jaws mounted on a spindle adjacent said fixed jaws, a double-armed lever connected to said spindle, and cam surfaces adapted to be engaged by said double-armed lever to move said swinging jaws with reference to said fixed jaws during the travel of the carrier.

8. In a machine of the class described, in combination, a traveling carrier, a pair of jaws supported thereon adapted to receive the body and end blanks of a can or similar article, a pair of swinging jaws mounted on a spindle adjacent said fixed jaws, a double-armed lever connected to said spindle, and cam surfaces arranged in the path of movement of said double-armed lever, said cam surfaces being so arranged successively that as the swinging jaws under the control of one arm of said double-armed lever tend to come to a dead center the other arm of the double-armed lever will be picked up by a second cam surface.

9. In a machine of the class described, in combination, a traveling carrier, blank receiving and holding jaws carried thereby, swinging jaws mounted adjacent said first mentioned jaws, a double-armed lever connected to said swinging jaws for controlling the swinging movement thereof and cam surfaces arranged in the path of the arms of said double-armed lever in such a manner that as the swinging jaws under the control of one arm of the double-armed lever tend to come to a dead center, the other arm of the double-armed lever will be picked up by another cam surface.

10. In a machine of the class described, in combination, a traveling carrier, blank receiving and holding jaws carried thereby, swinging jaws pivoted adjacent said first mentioned jaws and adapted to coöperate therewith in holding the blanks, a double-armed lever connected to said swinging jaws and cam surfaces arranged in the path of the arms of said double-armed lever and controlling the movement of said swinging jaws, the construction and arrangement being such that the movement of the jaws under the control of said double-armed lever and cam surfaces may be a continuous one.

11. In a machine of the class described, in combination, a traveling carrier, blank receiving and holding jaws carried thereby, swinging jaws pivoted adjacent said first mentioned jaws and adapted to coöperate therewith in holding the blanks, means whereby said swinging jaws may be closed down upon said first mentioned jaws during the travel of the carrier, supplemental means whereby said swinging jaws may be positively clamped with reference to said primary jaws and means for applying pressure to the blanks while so clamped.

12. In a machine of the class described, in combination, a traveling carrier, a series of fixed jaws carried thereby, swinging jaws associated with said fixed jaws, positively acting means for throwing said swinging jaws to and from said fixed jaws during the travel of the carrier, a bridge or arch independent of said throwing means beneath which said carrier passes, and means for clamping said swinging jaws to said fixed jaws carried by said bridge.

13. In a can heading machine of the class described, in combination, a traveling carrier, a series of fixed jaws carried thereby adapted to receive and hold the body and end blanks of a can, swinging jaws associated with said fixed jaws adapted during the travel of the carrier to be swung down upon said blanks to hold them in position, means associated with said jaws for forcing the body and end blanks together, a bridge or arch extending across the path of travel of said carrier and means carried thereby for actuating said forcing means.

14. In a can heading machine of the class described, in combination, a traveling carrier, a series of fixed jaws carried thereby adapted to receive and hold the body and end blanks of a can, swinging jaws associated with said fixed jaws adapted during the travel of the carrier to be swung down upon said blanks to hold them in position, means associated with said jaws for forcing the body and end blanks together, a bridge or arch extending across the path of travel of said carrier, means carried thereby for actuating said forcing means and supplemental clamping means for controlling the operation of said swinging jaws also carried by said bridge.

15. In a machine of the class described, in combination, a pivoted blank holding jaw, means for swinging said jaw on a pivot to release a blank held thereby and a stripper bar mounted in position to prevent the blank from following the movement of said swinging jaw.

16. In a machine of the class described, in combination, a blank receiving and holding jaw, a supplemental blank holding jaw pivotally mounted adjacent thereto for swinging movement, means for swinging said jaw away from the fixed jaw to release a blank held thereby and a stripper bar mounted in the path of travel of said swinging jaw to prevent the blank following the jaw in its swinging movement.

17. In a machine of the class described, in combination, a rotary carrier, a series of fixed jaws carried thereby, a series of swinging jaws associated with said fixed jaws, means interposed in the path of travel of the carrier for throwing said swinging jaws away from said fixed jaws to release a blank held thereby, and a stripper bar shaped to conform to the line of travel of the carrier arranged in position to strip the blanks from the swinging jaws as such jaws are thrown back.

18. In a machine of the class described, in combination, a blank carrying jaw adapted to be compressed upon blanks held therein, yielding pressure shoes adapted to apply clamping pressure to said jaws and plungers adapted to operate upon the blanks while so held.

19. In a machine of the class described, in combination, a blank carrying jaw adapted to be compressed upon blanks held therein, yielding and adjustable pressure shoes adapted to apply clamping pressure to said jaws, and plungers adapted to operate upon the blanks while so held.

20. In a machine of the class described, in combination, jaws adapted to receive and hold the body and end blanks of a can or similar article and to be clamped thereto to hold said blanks in position, adjustable pressure shoes having cam surfaces adapted to coöperate with said jaws for applying clamping pressure to the blanks, and means for applying pressure to force said blanks together while so clamped.

21. In a machine of the class described, in combination, a traveling carrier, blank holding jaws carried thereby adapted to receive and be clamped upon the body and end blanks of a can or similar article, a heading plunger mounted adjacent said jaw and carried therewith but held normally out of operative position, and a cam surface arranged in the path of said plunger, said cam surface being mounted so as to yield in a direction at right angles to the line of travel of said plunger and also in a direction in line with said travel.

22. In a machine of the class described, in combination, a rotary carrier, a fixed jaw and a clamping jaw supported thereon adapted to hold the body and end blanks of a can or similar article, means interposed in the path of said clamping jaw for applying a clamping pressure thereto, a plunger carried with said jaw and adapted to force said body and end blanks together, means for normally holding said plunger out of operative position, and a rotary cam surface interposed in the path of said plunger and adapted to be engaged thereby.

23. In a machine of the class described, in combination, a rotary carrier, a fixed jaw and a clamping jaw supported thereon adapted to hold body and end blanks of a can or similar article, means interposed in the path of said clamping jaw for applying a clamping pressure thereto, a plunger carried with said jaw and adapted to force said body and end blanks together, means for normally holding said plunger out of operative position, and a rotary cam surface interposed in the path of said plunger and held by spring pressure to be engaged thereby.

24. In a machine of the class described, in combination, a traveling carrier, jaws supported thereon, adapted to receive and hold the body and end blanks of a can or similar article, a plunger adapted to force said body and end blanks together and a cam surface flexibly and rotatably mounted in the path of said plunger.

25. In a machine of the class described, in combination, a traveling carrier, a blank holding jaw supported thereon, an ejector pivoted adjacent thereto in a direction transverse of the path of travel thereof, and means for bringing said ejector into operation to force the can from said jaw at a predetermined point in the travel of the carrier.

26. In a machine of the class described, in combination, a feeding in chute, a continuously traveling carrier, a series of jaws supported thereon and adapted to successively pick up can head blanks from the end of said chute, pins for restraining the lowermost pair of blanks of the line and parts connected to said pins adapted to be actuated to withdraw simultaneously the pins from contact with the lowermost pair of blanks as each holding jaw comes into position beneath the end of the chute.

27. In a machine of the class described, in combination, a feeding in chute, a continuously traveling carrier, a series of jaws supported thereon adapted to be successively brought into position beneath said chute to receive blanks therefrom, a pair of detents for restraining the movement of blanks within said chute mounted respectively without each side of said chute, and means connected to said detents adapted to be actuated by the jaws as they are brought in the proper position with relation to the chute.

28. In a can heading machine, in combination, a traveling carrier, a series of jaws carried thereby, a feeding in chute adapted to feed blanks to said jaws and presser fingers adapted to position said blanks with reference to said jaws and also with reference to each other.

29. In a machine of the class described, a presser finger, or separator for acting upon the periphery of can ends and between a can end and body, said presser finger comprising a curved arm adapted to travel upon the periphery of an end blank and a thin plate attached thereto adapted to pass between the end blank and the body blank.

30. In a machine of the class described, in combination, a traveling carrier, a feeding in chute adapted to feed body and end blanks thereto, and a presser finger or separator adapted to regulate the position of said blanks with reference to said carrier and to each other, said presser finger comprising a pivotally mounted arm, a part carried thereby adapted to rest upon the periphery of a can end as it passes into the control of the traveling carrier, and a second part adapted to pass between a can end and body.

31. In a machine of the class described, in combination, a blank holding and receiving jaw, a substantially semi-cylindrical half mold or jaw pivotally mounted on an axis parallel to the longitudinal axis of said blank holding jaw, positively acting means for moving said swinging half jaw on its axis toward or from the fixed jaw and additional means for applying pressure to said pivotally mounted jaw.

32. In combination, a rotatable member, a plurality of fixed receiving jaws, a plurality of clamping jaws, and means for positively actuating said clamping jaws located upon one side of said rotatable member and of said clamping jaws in a direction substantially parallel to the axis of said rotatable member.

33. In combination, a rotatable member, a plurality of fixed receiving jaws, a plurality of clamping jaws pivotally secured thereto, and means adapted to positively open and close said clamping jaws located upon one side of said rotatable member and of said clamping jaws in a direction substantially parallel to the axis of said rotatable member.

34. In combination, a rotatable member, a plurality of receiving jaws, a plurality of clamping jaws, a can ejector for each pair of jaws, and means located upon opposite sides of said rotatable member adapted to positively actuate said clamping jaws and said can ejector.

35. In combination, a rotatable member, a plurality of fixed receiving jaws, a plurality of clamping jaws, a can ejector for each pair of jaws, and means located upon opposite sides of said rotatable member adapted to positively open and close said clamping jaws and to actuate said can ejector.

36. In combination, a rotatable member, a receiving jaw, a pivoted clamping jaw, a heading piston, an ejector corresponding to said receiving jaw, and means for actuating said clamping jaw and said heading piston located entirely upon one side of said rotatable member.

37. In combination, a rotatable member, a receiving jaw, a pivoted clamping jaw connected therewith, a heading piston, an ejector corresponding to said receiving jaw, and cams for actuating said clamping jaw, said ejector and said heading piston located entirely upon the sides of the rotatable member.

38. In combination, a rotatable member, a receiving jaw, a clamping jaw pivotally connected thereto, a heading piston, an ejector corresponding to said receiving jaw, and fixed cams adapted to actuate said clamping jaw, said heading piston and said ejector located entirely upon the sides of said rotatable member.

39. In combination, a rotatable spider, detachable chairs mounted upon said spider and extending outwardly in a radial direction therefrom, and blank receiving means upon said chairs.

40. In combination, a rotatable spider, detachable chairs adjustably mounted upon said spider and extending outwardly in a radial direction therefrom, and blank receiving means upon said chairs.

41. In combination, a rotatable spider, detachable chairs adjustably mounted directly upon said spider and extending outwardly in a radial direction therefrom, and blank receiving means upon said chairs.

42. In combination, a rotatable spider, detachable chairs rigidly mounted upon said spider and extending outwardly in a radial direction therefrom, and blank receiving means upon said chairs.

43. In combination, a rotatable spider, detachable chairs adjustably and rigidly mounted directly upon said spider and extending outwardly in a radial direction therefrom, and blank receiving means upon said chairs.

44. In combination, a rotatable spider, detachable chairs mounted upon said spider and extending outwardly in a radial direction therefrom, blank receiving means upon said chairs, and spanners adapted to bridge the space between adjacent chairs.

45. In combination, a rotatable spider, detachable chairs adjustably mounted directly upon said spider and extending outwardly in a radial direction therefrom, blank receiving means upon said chairs, and spanners adapted to bridge the space between adjacent chairs.

46. In combination, a rotatable spider, detachable chairs adjustably and rigidly mounted directly upon said spider and extending outwardly in a radial direction therefrom, blank receiving means upon said chairs, and spanners adapted to bridge the space between adjacent chairs.

47. In combination, a pair of fixed jaws, a pair of clamping jaws longitudinally pivoted thereto and adapted to clamp a blank at each end thereof, and an ejector pivoted so as to swing in a plane parallel to the plane in which said clamping jaws swing and adapted to eject blanks from said fixed jaws.

48. In combination, a spider, chairs radially secured to the outer ends of said spider, fixed jaws upon said chairs, a pair of clamping jaws pivoted thereto in a direction transverse of the direction of motion of said spider and adapted to clamp a blank at each end thereof, and an ejector pivoted so as to swing in a plane parallel to the plane in which said clamping jaws swing and adapted to eject blanks from said fixed jaws.

49. In combination, a receiving jaw, a clamping jaw, and two lever arms connected to said clamping jaw and adapted to actuate the same by successive engagement with cam surfaces.

50. In combination, a receiving jaw, a clamping jaw, cam surfaces and two unequal lever arms connected to said clamping jaw and adapted to actuate the same by successive engagement with said cam surfaces, the longer arm being last actuated as the jaw is closed.

51. In combination, a receiving jaw, a clamping jaw adapted to close thereon, means adapted to swing said clamping jaw quickly through the first part of said closing movement, and additional means for swinging said jaw with less speed and more force during the latter part thereof.

52. In combination, a receiving jaw, a clamping jaw, means adapted to close said clamping jaw upon said receiving jaw, and additional means adapted to compress the same when in its closed position.

53. In combination, positively acting clamping means, heading means, and means adapted to increase the pressure upon said clamping means during the operation of said heading means.

54. In combination, clamping means, heading means, and adjustable means adapted to increase the pressure upon said clamping means during the operation of said heading means.

55. In combination, clamping means, heading means, and flexibly mounted means adapted to increase the pressure upon said clamping means during the operation of said heading means.

56. In combination, cam actuated clamping means, cam actuated heading means, and means adapted to increase the pressure upon said clamping means during the operation of said heading means.

57. In combination, cam-actuated clamping means, cam-actuated heading means, and adjustable means adapted to increase the pressure upon said clamping means during the operation of said heading means.

58. In combination, a rotatable spider chairs mounted radially thereon carrying clamping means, heading means, and means adapted to increase the pressure upon said clamping means during the operation of said heading means.

59. In combination, a rotatable spider, detachable chairs mounted radially thereon carrying clamping means, heading means, and adjustable means adapted to increase the pressure upon said clamping means during the operation of said heading means.

60. In combination, a rotatable spider, detachable and adjustable chairs mounted radially thereon carrying cam-actuated clamping means, cam-actuated heading means, and cams adapted to increase the pressure upon said clamping means during the operation of said heading means.

61. In combination, a rotatable spider having chairs mounted thereon extending outwardly in a radial direction and carrying clamping means, heading means, and means adapted to increase the pressure upon said clamping means during the operation of said heading means.

62. In combination, a rotatable spider having chairs mounted thereon extending outwardly and carrying clamping means, heading means, and means adapted to increase the pressure upon said clamping means during the operation of said heading means.

63. In combination, a rotatable spider having chairs mounted thereon extending outwardly therefrom and carrying clamping means, heading means and flexibly mounted means adapted to increase the pressure upon said clamping means during the operation of said heading means.

64. In combination, a rotatable spider having chairs detachably mounted thereon extending outwardly therefrom and carrying clamping means, cam-actuated heading means, and adjustable means adapted to increase the pressure upon said clamping means during the operation of said heading means.

65. In combination, a rotatable spider having chairs detachably and adjustably mounted thereon extending outwardly therefrom and carrying cam-actuated clamping means, cam-actuated heading means, and means adapted to increase the pressure upon said clamping means during the operation of said heading means.

66. In combination, a rotatable member having chairs detachably and adjustably mounted thereon extending outwardly therefrom and carrying cam-actuated clamping means, cam-actuated heading means and adjustable flexibly mounted means adapted to increase the pressure upon said clamping means during the operation of said heading means.

67. In combination, a rotatable spider, chairs mounted radially thereon carrying clamping means, heading means, means adapted to increase the pressure upon said clamping means during the operation of said heading means, and spanners adapted to bridge over the space between adjacent chairs.

68. In combination, a rotatable spider having chairs mounted thereon extending outwardly therefrom and carrying clamping means, heading means, adjustable means adapted to increase the pressure upon said clamping means during the operation of said heading means, and spanners adapted to bridge over the space between adjacent chairs.

69. In combination, a rotatable spider having chairs mounted thereon extending outwardly therefrom and carrying clamping means, heading means, adjustable flexibly mounted means adapted to increase the pressure upon said clamping means during the operation of said heading means, and spanners adapted to bridge over the space between adjacent chairs.

70. In combination, clamping means, heading means, means adapted to increase the pressure upon said clamping means during the operation of said heading means, and means adapted to co-act with said clamping means in positioning and spacing blanks therein.

71. In combination, clamping means, heading means, adjustable means adapted to increase the pressure upon said clamping means during the operation of said heading means, and means adapted to co-act with said clamping means in positioning and spacing blanks therein.

72. In combination, a rotatable spider having chairs mounted thereon extending outwardly therefrom and carrying clamping means, heading means adjustable means adapted to increase the pressure upon said clamping means during the operation of said heading means, and means adapted to co-act with said clamping means to position and to space blanks therein.

73. In combination, a receiving jaw, a clamping jaw adapted to close thereon, means adapted to swing said clamping jaw quickly during the first part of said closing movement, additional means for swinging said jaw with less speed and more force during the latter part thereof, and further means adapted to apply pressure to said clamping jaw while in its closed position.

74. In combination, a traveling carrier, a fixed blank holding jaw supported thereon, a swinging jaw pivoted adjacent thereto, a double-armed lever mounted upon the pivot of said swinging jaw, and cam surfaces in position to engage successively the arms of said double-armed lever for rocking the swinging jaw on its pivot during the travel of said carrier.

75. In combination, a traveling carrier, blank receiving and holding jaws carried thereby, complementary swinging jaws pivoted adjacent said first-mentioned jaws and adapted to coöperate therewith in holding the blanks, a double-armed lever connected to said swinging jaws, and cam surfaces arranged in the path of the arms of said double-armed lever and controlling the movement of said swinging jaws, the construction and arrangement being such that the movement of the jaws under the control of said double-armed lever and cam surfaces may be a continuous one.

76. In combination, a traveling carrier, a series of fixed jaws carried thereby, swinging jaws associated with said fixed jaws, positively acting means for drawing said swinging jaws to and from said fixed jaws during the travel of said carrier, a bridge or arch beneath which said carrier passes, and means for clamping said swinging jaws to said fixed jaws carried by said bridge.

77. In combination, a base, standards mounted thereon, a bridge supported upon said standards, cam surfaces upon said bridge and separate cam surfaces upon said standards, and a member adapted to rotate between said standards carrying means adapted to co-act with the cam surfaces upon said bridge and said standards.

78. In combination, a base, standards mounted thereon, a bridge detachably supported upon said standards, cam surfaces supported from said bridge, and a member adapted to rotate in a direction transverse of said bridge between said standards carrying means adapted to co-act with said cam surfaces.

79. In combination, a base, standards mounted thereon, a bridge supported upon said standards, adjustable cam surfaces supported from said bridge, and a member adapted to rotate between said standards carrying means adapted to co-act with said cam surfaces.

80. In combination, a base, standards mounted thereon, a bridge supported upon said standards, adjustable spring-pressed cam surfaces supported from said bridge, and a member adapted to rotate between said standards carrying means adapted to co-act with said cam surfaces.

81. In combination, a base, standards mounted thereon, a bridge detachably supported upon said standards, adjustable spring-pressed cam surfaces supported from said bridge, and a member adapted to rotate in a direction transverse of said bridge between said standards carrying means adapted to co-act with said cam surfaces.

82. In combination, a receiving jaw, a clamping jaw, cam surfaces adapted to swing said clamping jaw, and means adapted to apply pressure to said clamping jaw upon its release by said cam surfaces.

83. In combination, a receiving jaw, a clamping jaw, means adapted to swing said clamping jaw, and pressure shoes adapted to apply pressure to said clamping jaw upon its release by said swinging means.

84. In combination, a receiving jaw, a clamping jaw, cam surfaces adapted to swing said clamping jaw and pressure shoes adapted to apply pressure to said clamping jaw upon its release by said cam surfaces.

85. In combination, a receiving jaw, a clamping jaw, a lever adapted to actuate said clamping jaw, cam surfaces adapted to actuate said lever, and means adapted to apply pressure to said clamping jaw as said lever is disengaged by said cam surfaces.

86. In combination, a receiving jaw, a clamping jaw, a lever adapted to actuate said clamping jaw, cam surfaces adapted to actuate said lever, and pressure shoes adapted to apply pressure to said clamping jaw as said lever is disengaged by said cam surfaces.

87. In combination, a receiving jaw, a clamping jaw, positively acting means adapted to swing said clamping jaw, and means adapted to apply pressure to said clamping jaw upon the release thereof by said swinging means.

88. In combination, a receiving jaw, a clamping jaw, positively acting means adapted to swing said clamping jaw toward said receiving jaw, means adapted to swing said clamping jaw away from said receiving jaw, and means adapted to apply pressure to said clamping jaw after engagement by said first-mentioned swinging means and before engagement by said second-mentioned swinging means.

89. In combination, a receiving jaw, a clamping jaw, cam surfaces adapted to swing said clamping jaw toward said receiving jaw, cam surfaces adapted to swing said clamping jaw away from said receiving jaw, and means adapted to apply pressure to said clamping jaw after engagement by said first-mentioned cam surfaces and before engagement by said second-mentioned cam surfaces.

90. In combination, a receiving jaw, a clamping jaw, cam surfaces adapted to swing said clamping jaw toward said receiving jaw, cam surfaces adapted to swing said clamping jaw away from said receiving jaw, and cam surfaces adapted to apply pressure to said clamping jaw after engagement by said first-mentioned cam surfaces and before engagement by said second-mentioned cam surfaces.

91. In a machine of the class described, in combination, a rotatable member carrying blank receiving jaws, a chute having a portion at each side thereof adapted to feed can heads thereto, an oscillating member at each side of said chute and without the same adapted to project through the outer wall of the corresponding portion of said chute within which can heads are fed, and means upon said rotatable member adapted to actuate said oscillating members.

92. In a machine of the class described, in combination, means adapted to receive can head and can body blanks, means adapted to feed said blanks thereto, a pivotally mounted gravity actuated finger adapted to space each of said can heads from the corresponding can body, and means upon said finger adapted to engage said blanks and force the same within the blank receiving means.

93. In a machine of the class described, in combination, means adapted to receive can head and can body blanks, means adapted to feed said blanks thereto, and a pair of fingers, each of which is provided with a shoulder and a thin portion, said thin portion being adapted properly to space said head and body blanks and said shoulder being adapted to press said blanks within said receiving means.

In testimony whereof I affix my signature, in the presence of two witnesses.

CHARLES W. GRAHAM.

Witnesses:
H. J. COOKINHAM,
SANFORD F. SHERMAN.